Figure 1:
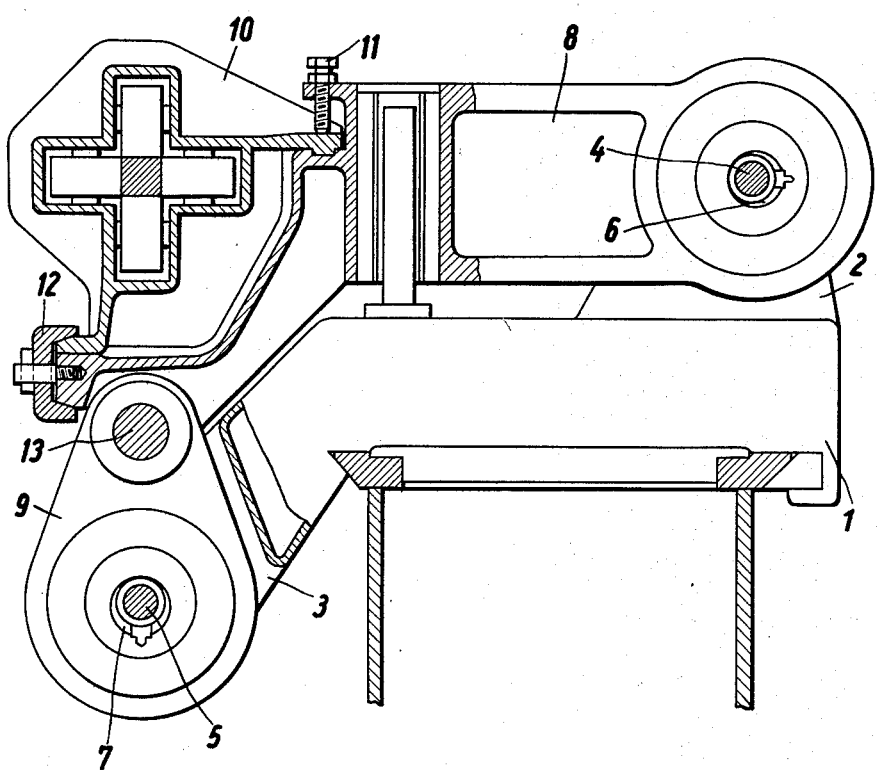

June 7, 1966 P. SCHMITT 3,254,520
MACHINE FOR STRAIGHTENING ELONGATED BODIES
Filed Jan 14, 1964 2 Sheets-Sheet 1

Inventor:
Paul Schmitt,
By [signature],
His Attorney.

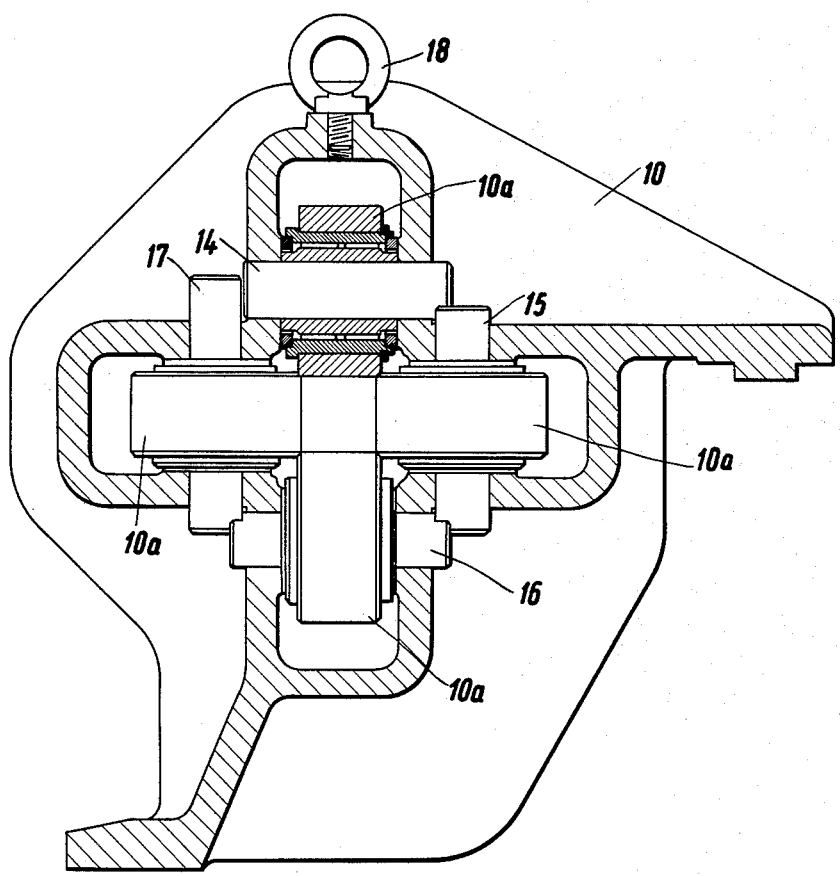

3,254,520
MACHINE FOR STRAIGHTENING
ELONGATED BODIES
Paul Schmitt, Saarbrucken, Germany, assignor to Mannesmann - Meer Aktiengesellschaft, Monchen-Gladbach, Germany, a corporation of Germany
Filed Jan. 14, 1964, Ser. No. 337,668
Claims priority, application Germany, Jan. 18, 1963,
M 55,489
3 Claims. (Cl. 72—112)

The invention relates to the straightening of elongated hollow and solid bodies, such as metal rods, tubes, beams, and the like, by continuously feeding without rotation the elongated body through a dressing tool carrying frame that surrounds the elongated body, the frame being oscillated in a plane perpendicular to the direction in which the elongated body to be straightened is fed.

More particularly, the invention relates to a machine or apparatus for that purpose.

Reference is had to the pending patent application of Karl Böhm, Ser. No. 243,867, and now Patent No. 3,176,491, issued on April 16, 1965, which has been assigned to the assignee of the instant application and which derived its priority from the corresponding application filed in the Federal Republic of Germany on Dec. 12, 1961 (No. M 51168 Ib/49h).

The apparatus described in the aforesaid application Ser. No. 243,867 includes dressing tools that receive reciprocating movements of high frequency from each of two directions perpendicular to each other, the size of stroke of reciprocation in each of said perpendicular directions being variable independently of the other so that by the superposition of both reciprocating movements there result symmetrical paths for the dressing tool or tools about the ideal central position of the elongated body to be straightened.

The instant invention, which is in the nature of an improvement of the apparatus disclosed in the aforesaid application Ser. No. 243,867, has among its principal objects to provide for an arrangement of the reciprocating drives for the dressing tool or tools that is characterized by simplicity and saving of costs.

It is another object of the instant invention to provide for such an apparatus which permits a simple and quick exchange of dressing tools.

Further objects and advantages of the invention will be set forth in part in the following specification and in part will be obvious therefrom without being specifically referred to, the same being realized and attained as pointed out in the claims hereof.

The foregoing and other objects of the invention will be best understood from the following description of an exemplification thereof, reference being had to the accompanying drawings, wherein:

FIG. 1 is an elevational view, partly in section, of an apparatus in accordance with the invention which includes a dressing tool carrying frame; and FIG. 2 is a large scale sectional view of that frame.

In carrying the invention into effect in one of the embodiments which has been selected for illustration in the accompanying drawings and for description in this specification, and referring now particularly to FIG. 1, there is provided a machine bed 1. The machine bed 1 carries two bearings 2, 3 for two parallel drive shafts 4 and 5, respectively. These drive shafts 4, 5 are driven synchronously by any well-known, suitable driving means (not shown), for instance as indicated in the aforesaid application Ser. No. 243,867. The drive shafts 4, 5 are journalled in eccentric bushings 6 and 7, respectively.

The eccentric bushing 6 is mounted in a first one-armed swinging lever or connecting rod 8, and the eccentric bushing 7 is mounted in a second one-armed swinging lever or connecting rod 9. The eccentric bushings 6 and 7 are of well-known construction, and their eccentricity, and thereby the size of reciprocating stroke imparted to the respective connecting rod may be adjusted in any suitable well-known manner.

The first connecting rod 8, as best shown in FIG. 1, may be disposed to a major extent substantially horizontally, and the second connecting rod 9 to a major extent substantially vertically. The first connecting rod 8 may be so shaped that a frame 10 that carries dressing tools such as dressing rolls 10a (FIG. 2), may be removably connected to the first connecting rod 8 by suitable releasable connecting means, for instance a set screw 11 and a clamp 12. The second connecting rod 9 is connected to the first connecting rod 8 by means of a pivot pin 13.

The connecting rods 8 and 9 with their eccentric bushings 6 and 7 thus are so arranged that the horizontal extension of the axis of rotation perpendicular to the drive shaft of one connecting rod, for instance the shaft 4, eccentric bushing 6 of the connecting rod 8, intersects at right angle the vertical extension of the axis of rotation perpendicular to the drive shaft of the other connecting rod, for instance the shaft 5, the eccentric bushing 7 of the connecting rod 9, at the longitudinal axis of the elongated body in the plane of oscillation or reciprocation of the dressing tool; this plane is at right angle to said longitudinal axis of said elongated body.

By adjusting selectively to a different extent, each of the eccentric bushings 6 and 7, the result of superposition of the reciprocating movements of the connecting rods 8 and 9 may be varied thereby to impart to the frame 10 of the dressing tools the desired dressing motion.

In the instant embodiment, the elongated body has been given, by way of exemplification, a square cross section.

The dressing tool carrying frame 10 is shown in greater detail in FIG. 2. The dressing rolls 10a turn about pins designated in mounting sequence (clockwise in respect of FIG. 2) 14, 15, 16 and 17, respectively, and each of these pins has a surface that cooperates with the next adjoining pin in such a manner that each secures the adjacent pin in position.

The frame 10 includes a ring 18 for easy upward removal of the frame 10, after the set screw 11 and the clamp 12 have been loosened.

The frame 10 is thus easily mounted, removed, and exchanged.

It will be apparent to those skilled in the art that the novel principles of the invention disclosed herein in connection with a specific exemplification thereof will suggest various other modifications and applications of the same. Accordingly, I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a machine for straightening elongated bodies, fed in one direction free from rotation, in combination, a dressing tool carrying frame adapted to receive the elongated body fed therethrough and operable to be oscillated in a plane perpendicular to the longitudinal axis of said elongated body, two connecting rods, drive means including two drive shafts and two adjustable eccentrics each driven by a shaft and each in driving connection with a connecting rod, operable for reciprocating said connecting rods and thereby to oscillate said frame and so arranged that the horizontal extension of the axis of rotation at right angle to the drive shaft of one of said connecting rods intersects at right angle the vertical extension of the axis of rotation perpendicular to the drive shaft of the other connecting rod at said longitudinal axis of the body in said plane, one of said connecting rods being operable to carry said frame, and the other connecting rod being pivoted to said first connecting rod.

2. In a machine, as claimed in claim 1, said frame being exchangeable, and means for releasably connecting said frame to said one connecting rod comprising a set screw and a clamp.

3. In a machine, as claimed in claim 1, said dressing tools comprising rolls, and pins journalling said rolls, each pin having a surface in contact with an adjoining pin, for securing said pins in place.

References Cited by the Examiner
UNITED STATES PATENTS
3,176,496  4/1965  Böhm _____ 72—467

CHARLES W. LANHAM, *Primary Examiner.*

R. D. GREFE, *Assistant Examiner.*